United States Patent
Street et al.

(10) Patent No.: US 6,266,203 B1
(45) Date of Patent: Jul. 24, 2001

(54) INTEGRATED TEMPERATURE SENSE CIRCUIT IN A DISC DRIVE

(75) Inventors: David Ray Street, Oklahoma City; John Michael Baker, Tuttle; Karl Louis Enarson, Yukon; Timothy Ted Walker, Edmond; Ronald Duane Metzner, Yukon; Anish A. Ukani, Oklahoma City, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/052,887

(22) Filed: Mar. 31, 1998

Related U.S. Application Data

(63) Continuation-in-part of application No. 08/962,459, filed on Oct. 31, 1997, now abandoned.
(60) Provisional application No. 60/062,195, filed on Oct. 16, 1997, and provisional application No. 60/049,614, filed on Jun. 13, 1997.

(51) Int. Cl.⁷ ........................................ G11B 5/02
(52) U.S. Cl. .................. 360/69; 360/75; 360/68; 360/73.03
(58) Field of Search ..................... 360/66, 67, 68, 360/46, 31, 51, 75, 53, 69, 73.03; 369/116; 327/512, 513

(56) References Cited

U.S. PATENT DOCUMENTS

| | | | | |
|---|---|---|---|---|
| 3,723,980 | | 3/1973 | Gabor . | |
| 4,799,112 | | 1/1989 | Bremmer et al. . | |
| 4,821,125 | * | 4/1989 | Christensen et al. | 360/31 |
| 4,907,109 | | 3/1990 | Senio . | |
| 4,965,501 | | 10/1990 | Hashimoto . | |
| 5,047,876 | | 9/1991 | Holsinger . | |
| 5,084,791 | * | 1/1992 | Thanos et al. | 360/77.04 |
| 5,128,813 | * | 7/1992 | Lee | 360/78.06 X |
| 5,262,907 | | 11/1993 | Duffy et al. . | |
| 5,276,662 | | 1/1994 | Shaver, Jr. et al. . | |
| 5,408,365 | | 4/1995 | Van Doorn et al. . | |
| 5,408,367 | * | 4/1995 | Emo | 360/53 |
| 5,422,760 | | 6/1995 | Abbott et al. . | |
| 5,455,717 | | 10/1995 | Van Doorn et al. . | |
| 5,550,502 | | 8/1996 | Aranovsky . | |
| 5,592,340 | | 1/1997 | Minuhin et al. . | |
| 5,631,999 | | 5/1997 | Dinsmore . | |
| 5,726,818 | * | 3/1998 | Reed et al. | 360/51 |
| 5,732,055 | * | 3/1998 | Masaki et al. | 369/116 X |
| 6,124,998 | * | 9/2000 | Kanegae | 360/68 |

* cited by examiner

*Primary Examiner*—David Hudspeth
*Assistant Examiner*—Kin Wong
(74) *Attorney, Agent, or Firm*—Crowe & Dunlevy

(57) ABSTRACT

A method and apparatus are disclosed for optimizing operational performance of a disc drive. The disc drive is provided with an integrated temperature measurement circuit which provides a temperature measurement signal indicative of operational temperature of the disc drive. The integrated temperature measurement circuit is formed as part of an application specific integrated circuit (ASIC) housing additional circuitry used by the disc drive during operation. A parametric configuration circuit, operably coupled to the integrated temperature measurement circuit, identifies selected parameters for use by the disc drive to optimize disc drive performance, the parameters arranged as a plurality of parameter sets corresponding to a plurality of predefined operational temperature ranges. The parametric configuration circuit periodically measures the operational temperature of the disc drive through evaluation of the temperature measurement signal, identifies the operational temperature range in which the measured operational temperature falls, and implements the parameter set corresponding to the identified operational temperature range.

16 Claims, 4 Drawing Sheets

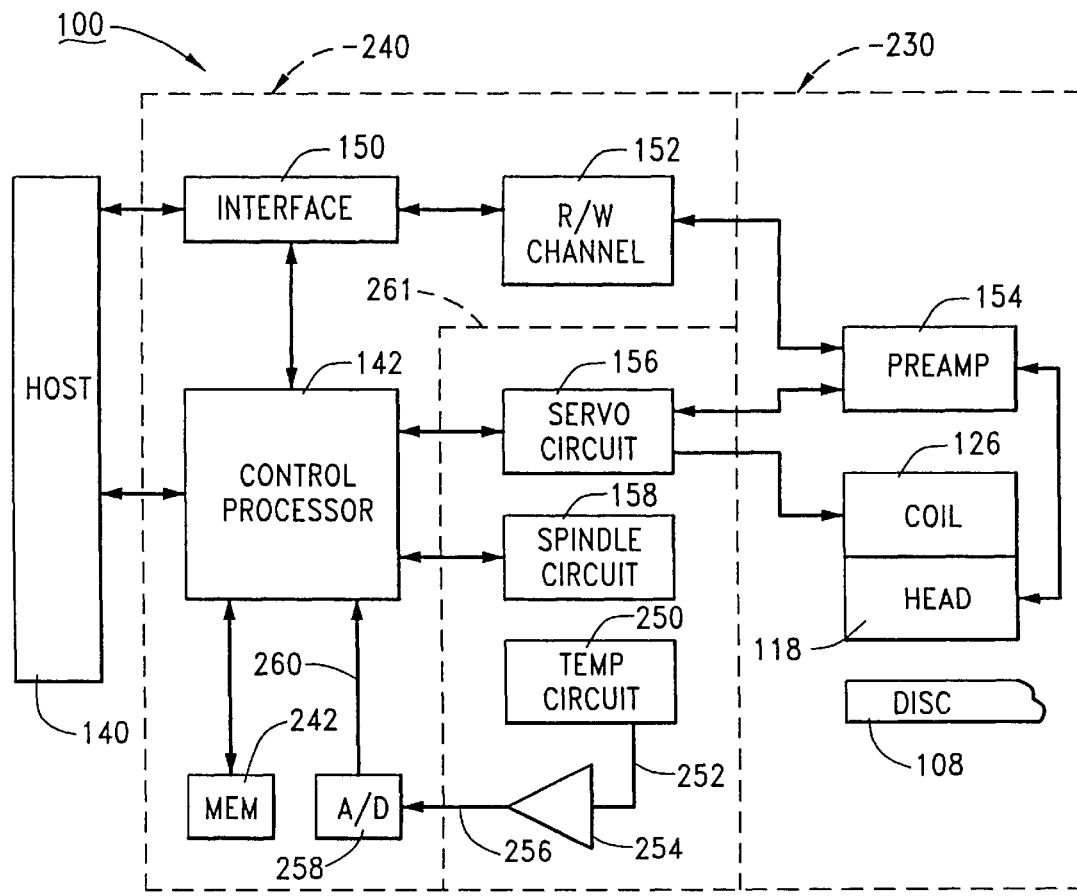
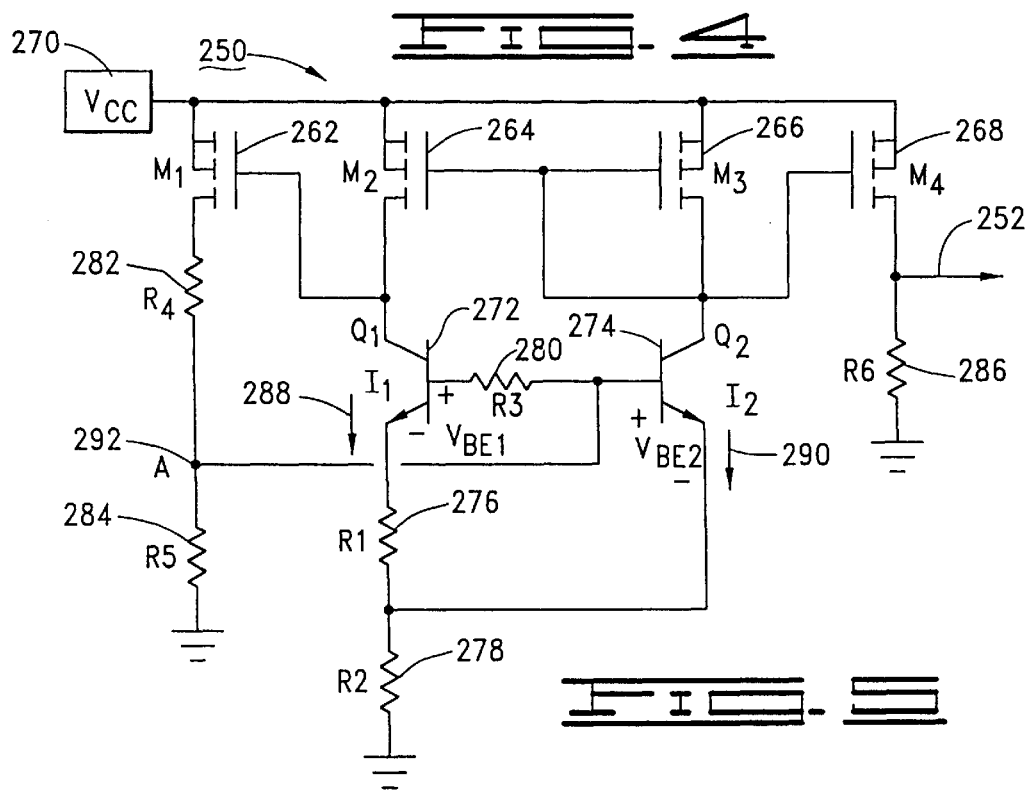

INTEGRATED TEMPERATURE SENSE CIRCUIT IN A DISC DRIVE

RELATED APPLICATIONS

This application is a continuation-in-part of U.S. patent application Ser. No. 08/962,459 entitled TEMPERATURE DEPENDENT DISC DRIVE PARAMETRIC CONFIGURATION, filed Oct. 31, 1997.

This application claims the benefit of U.S. Provisional Patent application No. 60/049,614 entitled WRITE CURRENT TEMPERATURE CONTROLLED CONFIGURATION, filed Jun. 13, 1997, and U.S. Provisional Patent Application No. 60/062,195 entitled INTEGRATED TEMPERATURE SENSOR, filed Oct. 16, 1997.

FIELD OF THE INVENTION

This invention relates generally to the field of disc drive storage devices, and more particularly, but not by way of limitation, to optimization of disc drive performance through configuration of a disc drive in relation to the temperature of the drive as sensed by an integrated temperature sense circuit.

BACKGROUND OF THE INVENTION

Hard disc drives enable users of computer systems to store and retrieve vast amounts of data in a fast and efficient manner. In a typical disc drive, the data are magnetically stored on one or more discs which are rotated at a constant high speed and accessed by a rotary actuator assembly having a plurality of read/write heads that fly adjacent the surfaces of the discs.

The position of the heads is controlled by a closed loop, digital servo circuit. A preamp and driver circuit generates write currents that are used by the head to magnetize the disc during a write operation and amplifies read signals detected by the head during a read operation. A read/write channel and interface circuit are operably connected to the preamp and driver circuit to transfer the data between the discs and a host computer in which the disc drive is mounted.

Disc drive manufacturers typically produce a large number of nominally identical drives which are individually optimized during the manufacturing process through the setting of parameters that affect the operation of various disc drive circuits, such as the preamp and driver circuit, the servo circuit and the read/write channel. Such parameters are well known and typically include write current, write precompensation, servo gain, data and servo level detection thresholds, transversal equalizer tap weights, adaptive filtering parameters and, in disc drives employing magneto-resistive (MR) heads, read bias current. Such parameters are used to enable the disc drive to accommodate changes in data transfer rates that occur with respect to the radii on the discs at which the data are stored, noise levels, electrical and mechanical offsets and the like, all of which generally affect the operation of the drive.

Accordingly, the parameters are often set to an initial value during disc drive operation and then optimized against predefined acceptance criteria (for example, measured read error rate). Disc drives are often further provided with the capability of continually monitoring drive performance and adjusting certain parameters adaptively during operation to maintain optimum levels of performance.

One of the most significant variables affecting disc drive performance is temperature. Disc drives are complex electromechanical devices which include motors to rotate the discs and the actuator assembly. Although such motors are designed to operate efficiently, heat will nevertheless be generated as the disc drive operates over an extended period of time, which can substantially increase the operating temperature of the drive. Disc drives further include one or more processors and associated integrated circuitry having performance characteristics which are also affected by changes in temperature.

Attempts have been made in the prior art to compensate for variations in temperature in magnetic recording devices such as disc drives. For example, U.S. Pat. No. 3,723,980 entitled TEMPERATURE COMPENSATION SYSTEM FOR A MAGNETIC DISK MEMORY UNIT issued Mar. 27, 1973 to Gabor compensates for variations in temperature through efforts to maintain a substantially uniform temperature and by using similar materials in similar locations within a drive. U.S. Pat. No. 5,408,365 entitled RECORDING DEVICE WITH TEMPERATURE-DEPENDENT WRITE CURRENT CONTROL issued Apr. 18, 1995 to Van Doom et al. discloses a magnetic tape device wherein a magneto-resistive head element in contact with a recording tape media is used to monitor the temperature of the media, enabling adjustments in write current magnitude accordingly. U.S. Pat. No. 5,550,502 entitled CONTROL CIRCUIT AND METHOD FOR THIN FILM HEAD WRITE DRIVER issued Aug. 27, 1996 to Aranovsky discloses a write driver control circuit in a magnetic storage device that provides sufficient range in the input voltage level to accommodate temperature and process variations during the operation of the device. U.S. Pat. No. 5,455,717 entitled RECORDING DEVICE WITH TEMPERATURE-DEPENDENT WRITE-CURRENT CONTROL issued Oct. 3, 1995 to Van Doom et al. discloses a compensation circuit for controlling the amplitude of the write current in relation to temperature variations within a drive.

These and other references generally teach either the use of various disc drive materials that are not significantly affected by temperature variations during operation, or such references generally teach to periodically measure the temperature of the disc drive and adjust various parameters accordingly. Such temperature measurements are performed using existing components of the recording devices (such as read heads in contact with magnetic tape media) or discrete temperature sensors which are mounted either inside the environmentally controlled housing of the disc drive, or on an externally mounted printed wiring assembly (PWA) of the drive.

Although such prior art approaches have been operable, there remains a continual need for improvements in the art whereby disc drive performance can be efficiently and readily optimized in response to variations in the temperature of a disc drive for a wide range of temperature-dependent disc drive parameters.

SUMMARY OF THE INVENTION

The present invention provides an apparatus and method for optimizing the operational performance of a disc drive.

In accordance with a preferred embodiment, the disc drive is provided with an integrated temperature measurement circuit which provides a temperature measurement signal indicative of operational temperature of the disc drive. The integrated temperature measurement circuit is preferably formed as part of an application specific integrated circuit (ASIC) housing additional circuitry used by the disc drive during operation.

A parametric configuration circuit, operably coupled to the integrated temperature measurement circuit, identifies selected parameters for use by the disc drive to optimize disc drive performance, the parameters arranged as a plurality of parameter sets corresponding to a plurality of predefined operational temperature ranges. The parametric configuration circuit periodically measures the operational temperature of the disc drive through evaluation of the temperature measurement signal, identifies the operational temperature range in which the measured operational temperature falls and implements the appropriate parameter set corresponding to the identified operational temperature range.

A selectable delay is implemented between periodic measurements of the operational temperature of the disc drive, so that, for example, the temperature is measured once a minute for the first ten minutes after the disc drive is initialized (during which large temperature changes can occur as the disc drive heats up from a cold start), and every ten minutes thereafter, until the disc drive is deinitialized.

These and various other features as well as advantages which characterize the present invention will be apparent from a reading of the following detailed description and a review of the associated drawings.

BRIEF DESCRIPTION OF THE DRAWINGS

FIG. 4 provides an alternative functional block diagram of the disc drive of FIG. 1, illustrating an integrated temperature circuit constructed in accordance with another preferred embodiment of the present invention.

FIG. 5 provides a schematic diagram of the integrated temperature circuit of FIG. 4.

DETAILED DESCRIPTION

Figure 1:
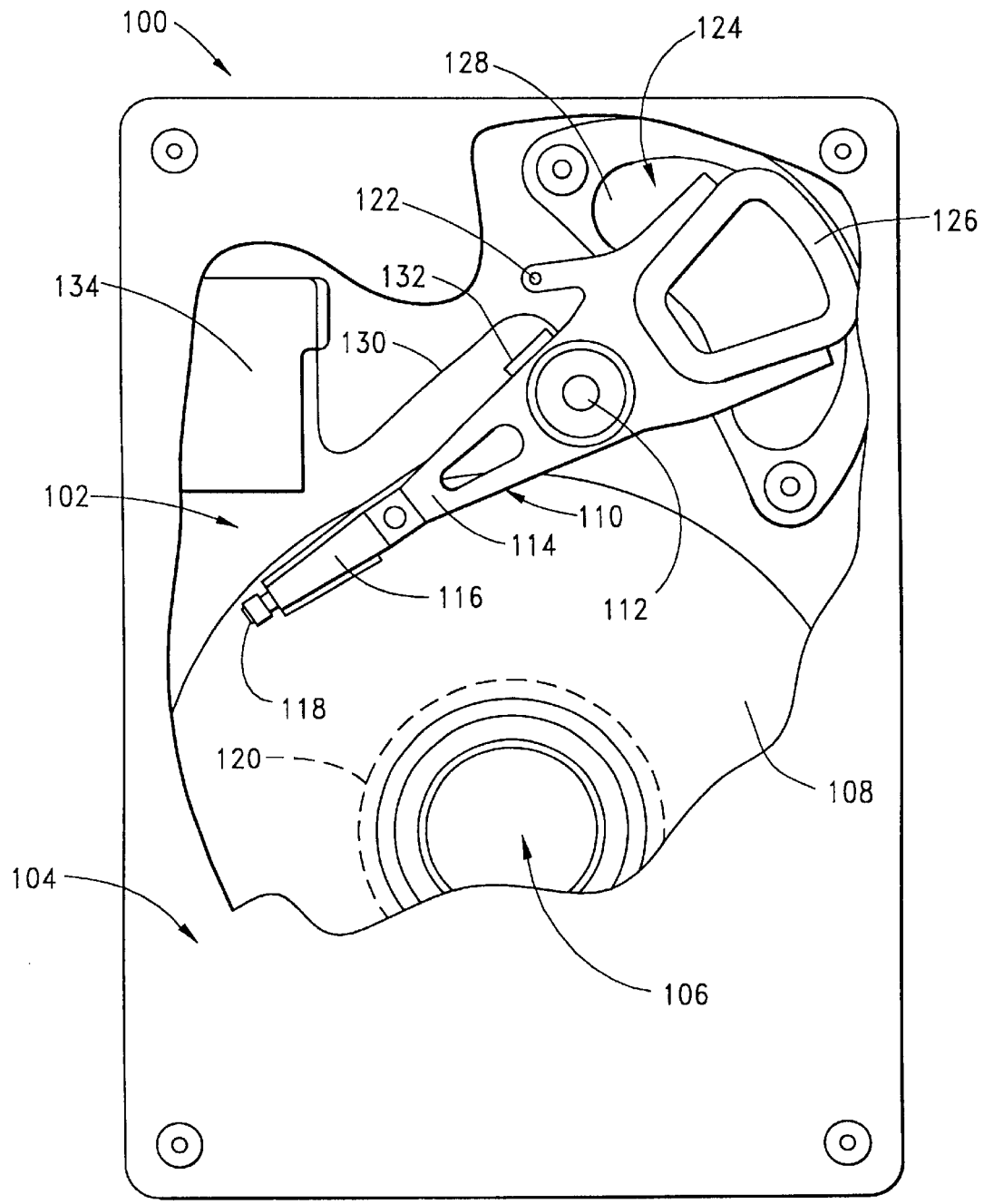
FIG. 1 shows a top plan view of a disc drive constructed in accordance with a preferred embodiment of the present invention.

Before discussing the operation of preferred embodiments of the present invention, it will be useful to first briefly describe a disc drive storage device in which the present invention can be advantageously practiced. Referring to FIG. 1, shown therein is a top plan view of a disc drive 100 having a base deck 102 on which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) is provided to rotate one or more discs 108 at a constant high speed. User data are written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend toward the discs 108, with one or more flexures 116 extending from the actuator arms 114. Mounted at the distal end of each of the flexures 116 is a head 118 which includes a slider assembly (not separately designated) designed to fly in close proximity to the corresponding surface of the associated disc 108.

When the disc drive 100 is not in use, the heads 118 are moved over landing zones 120 near the inner diameter of the discs 108 and the actuator assembly 110 is secured using a conventional latch arrangement, such as designated at 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. As will be recognized, a second magnetic flux path is disposed above the permanent magnet 128, but has not been shown for purposes of clarity. The controlled application of current to the coil 126 causes magnetic interaction between the permanent magnet 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown in FIG. 1) mounted to the bottom side of the disc drive 100.

Figure 2:
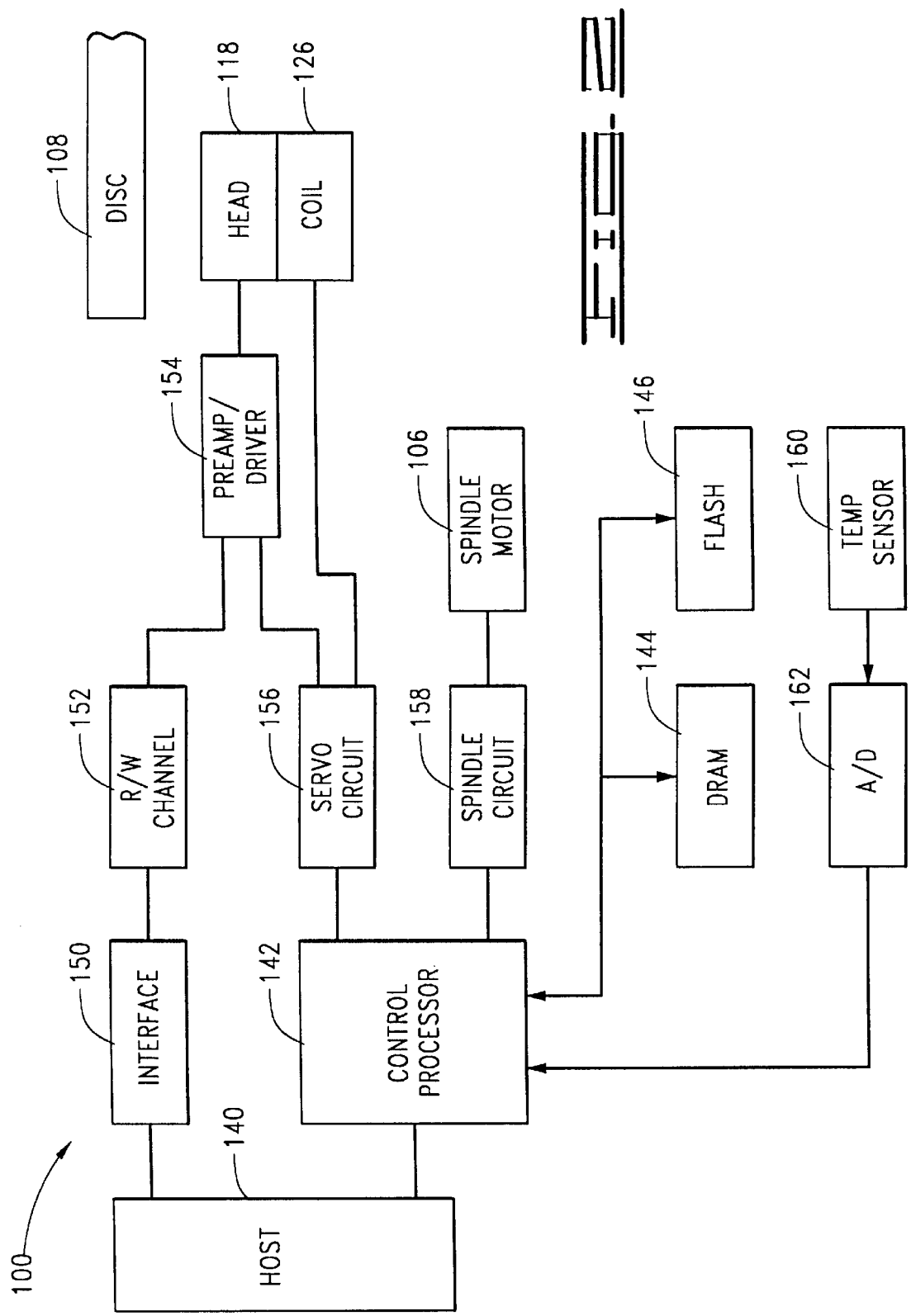
FIG. 2 provides a functional block diagram of the disc drive of FIG. 1 operably connected to a host computer in which the disc drive is mounted.

Referring now to FIG. 2, shown therein is a functional block diagram of the disc drive 100 of FIG. 1, generally showing the main functional circuits which are resident on the disc drive printed circuit board and used to control the operation of the disc drive 100.

The disc drive 100 is shown to be operably connected to a host computer 140 in which the disc drive 100 is mounted in a conventional manner. A disc drive control processor 142 provides top level control of the operation of the disc drive 100. Programming and information utilized by the control processor are provided in both volatile and non-volatile memory devices, including a dynamic random access memory (DRAM) device 144 and a flash memory device 146 shown in FIG. 2. It will be recognized, however, that the memory device structure can vary depending upon the requirements of a particular application.

The contents of the DRAM 144 are loaded periodically during the operation of the disc drive 100, such as during powerup.

An interface circuit 150 includes a data buffer (not shown) for the temporary buffering of data between the host computer 140 and the discs 108 and a sequencer (also not shown) that directs the operation of the disc drive 100 during data transfer operations. Generally, during a data write operation a read/write channel 152 encodes data to be written to the disc 108 with run-length limited (RLL) and error correction codes (ECC) and write currents corresponding to the encoded data are applied by a preamp driver circuit 154 to the head 118 in order to selectively magnetize the disc 108. During a data read operation, the preamp driver circuit 154 applies a read bias current to the head 118 and monitors the voltage across a magneto-resistive (MR) element of the head 118, which varies with respect to the selective magnetization of the disc 108. The voltage is preamplified by the preamp driver circuit 154 to provide a read signal to the read/write channel 152 which decodes the stored data and provides the same to the buffer of the interface circuit 150, for subsequent transfer to the host computer 140. For reference, disc drive read and write operations are discussed in greater detail in U.S. Pat. No. 5,276,662 entitled DISC DRIVE WITH IMPROVED DATA TRANSFER MANAGEMENT APPARATUS, issued Jan. 4, 1994 to Shaver, Jr. et al., assigned to the assignee of the present invention.

A servo circuit 156 controls the position of the head 118 through servo information read by the head 118 and provided to the servo circuit 156 by way of the preamp driver 154. The servo information indicates the relative position of the head 118 with respect to a selected track on the disc 108. In response to the servo information, a digital signal processor (not shown) controls the application of current to the coil 126 in order to adjust the position of the head 118 to a desired relation. The construction and operation of closed loop, digital servo systems such as 154 are generally discussed in U.S. Pat. No. 5,262,907 entitled HARD DISC DRIVE WITH IMPROVED SERVO SYSTEM, issued Nov. 16, 1993 to Duffy et al., assigned to the assignee of the present invention.

A spindle circuit 158 is provided to control the rotation of the discs 108 through back electromagnetic force (bemf) commutation of the spindle motor 106. For additional discussion of typical spindle circuits, see U.S. Pat. No. 5,631,999 entitled ADAPTIVE COMPENSATION FOR HARD DISC DRIVE SPINDLE MOTOR MANUFACTURING TOLERANCES, issued May 20, 1997 to Dinsmore, assigned to the assignee of the present invention.

Figure 3:
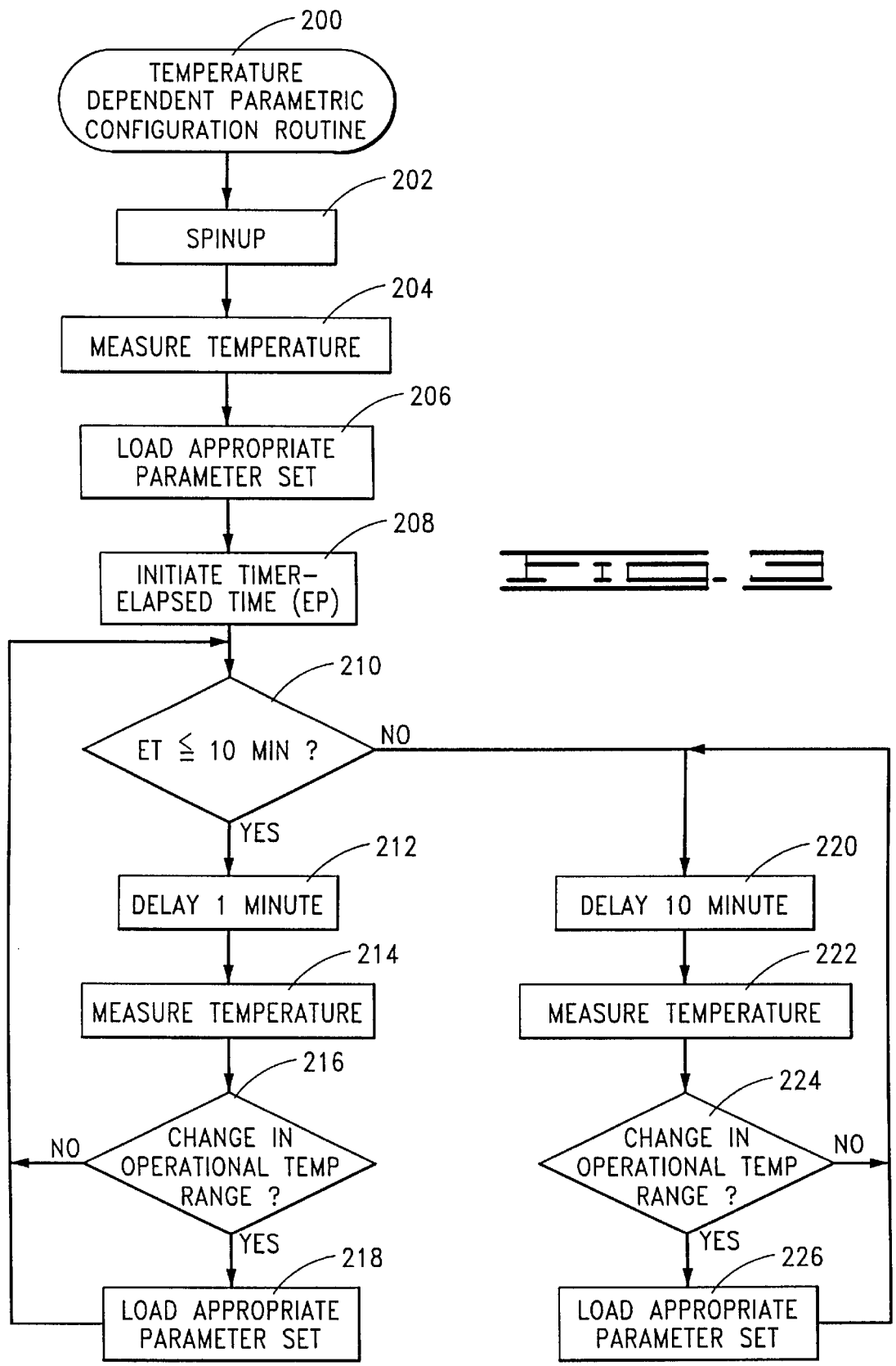
FIG. 3 provides a flow chart for a TEMPERATURE DEPENDENT PARAMETRIC CONFIGURATION routine, performed by the control processor of FIG. 2 in conjunction with programming and information stored in the DRAM and flash memory devices shown in FIG. 2.

Continuing with FIG. 3, a temperature sensor 160 is provided to measure the temperature of the disc drive 100. The temperature sensor is preferably mounted inside the interior of the disc drive 100 in proximity to the heads 118, although the temperature sensor can be mounted elsewhere, such as on the disc drive printed circuit board (not shown) housing the other disc drive electronics shown in FIG. 2. The output from the temperature sensor 160 is an analog temperature signal which is converted to digital form by an analog to digital (A/D) converter 162, so that the control processor 142 can obtain a digital indication of the temperature of the disc drive 100.

In the practice of a preferred embodiment, the control processor 142 initially establishes three parameter sets corresponding to three different operational temperature ranges: cold, ambient and hot. Cold is defined as a temperature of less than 15 degrees Celsius (° C.), ambient is defined as a temperature between (and including) 15° C. and 45° C., and hot is defined as a temperature above 45° C. Other temperature ranges could readily be established.

Each parameter set comprises values for selected parameters used by the read1write channel 152 and the servo circuit 156. The values are preferably optimized during dynamic burn-in (DBI) wherein the disc drive 100 is operated in an environmental chamber over a range of temperature extremes. In one approach, the parameters are selected as the disc drive 100 is operated within each of the above defined ranges. Alternatively, a population of nominally identical disc drives 100 are selected and evaluated to establish a series of delta-values, each indicative of parametric change relative to nominal values obtained when the disc drive is operated at a selected room-ambient temperature (such as 20° C.). Thereafter, each of the disc drives 100 is operated at the ambient temperature to establish baseline parametric values that are used for the ambient temperature range and the delta-values are added to the baseline parametric values to establish the parameter sets for the cold and hot temperature ranges.

The preferred parameters which are optimized and utilized in accordance with a preferred embodiment are listed in Table I. below.

TABLE I

| PARAMETER | COLD $T < 15°$ C. | AMBIENT $15°$ C. $\leq T \leq 45°$ C. | HOT $T < 45°$ C. |
|---|---|---|---|
| Write Current | $I_{W1}$ | $I_{W2}$ | $I_{W3}$ |
| Prewrite Comp. | $PC_1$ | $PC_2$ | $PC_3$ |
| Read Bias | $I_{R1}$ | $I_{R2}$ | $I_{R3}$ |
| Servo Gain | $K_{P1}$ | $K_{P2}$ | $K_{P3}$ |
| Data Threshold | $T_{D1}$ | $T_{D2}$ | $T_{D3}$ |
| Servo Threshold | $T_{S1}$ | $T_{S2}$ | $T_{S3}$ |
| Adaptive Filter | $F_1$ | $F_2$ | $F_3$ |
| Tap Weights | $W_{T1}$ | $W_{T2}$ | $W_{T3}$ |
| MR Asymmetry | $MR_1$ | $MR_2$ | $MR_3$ |
| VGA Gain | $K_{VGA1}$ | $K_{VGA2}$ | $K_{VGA3}$ |
| Servo Bandwidth | $B_{S1}$ | $B_{S2}$ | $B_{S3}$ |

The parameters listed in Table I. are well known and are typically employed in disc drives of the present generation; further, these parameters are provided merely for purposes of illustration and it will be readily understood that the practice of the present invention is not limited to use of these particular parameters. For purposes of clarity, however, each of these parameters will be briefly described as follows.

Beginning with write current, this parameter is the magnitude of the current passed through a write element of the head 118 during a write operation. The disc drive 100 is contemplated as employing zone based recording (ZBR) such as described in U.S. Pat. No. 4,799,112 entitled METHOD AND APPARATUS FOR RECORDING DATA issued Jan. 17, 1989 to Bremmer et al., assigned to the assignee of the present invention, so that a different write current is selected for each zone of tracks on the discs 108 (each of the tracks in each zone having the same number of data sectors). Moreover, write current is typically optimized for each head/disc combination, as discussed in copending U.S. Pat. No. 5,687,036 entitled SELECTION OF OPTIMUM WRITE CURRENT IN A DISC DRIVE TO MINIMIZE THE OCCURRENCE OF REPEATABLE READ ERRORS, issued Nov. 11, 1997 by Kassab, assigned to the assignee of the present invention.

Accordingly, the term $I_{W1}$ from Table I. describes a set of write current values for each head for each of the zones when the temperature T of the disc drive 100 is less than 15° C. (as measured by the temperature sensor 160). Similarly, the term $I_{W2}$ describes a second set of write current values for operation of the disc drive 100 in the range of 15° C.$\leq$T$\leq$45° C. and the term $I_{W3}$ describes a third set of write current values for operation of the disc drive at a temperature T above 45° C. Similar terms are provided in Table I. for each of the parameters listed.

The next parameter in Table I., prewrite compensation ("Prewrite Comp."), is a timing adjustment applied to the writing of each flux transition to the discs 108 in order to minimize perceived timing shifts in the subsequent detection of the transitions during a read operation. For reference, prewrite compensation is discussed in U.S. Pat. No. 5,047,876 entitled ADAPTIVE PREWRITE COMPENSATION APPARATUS, issued Sep. 10, 1991 to Holsinger, assigned to the assignee of the present invention.

Servo gain is the overall gain of the servo circuit 156 and is typically adjusted during the operation of the disc drive 100 to maintain optimal performance of the servo loop. Servo gain adjustments are discussed, for example, in U.S. Pat. No. 4,965,501 entitled SERVO CIRCUIT, issued Oct.

23, 1990 to Hashimoto. Data and servo thresholds are conventional readback signal detection levels used to decode control information and data from data and servo fields on the tracks of the discs 108. The adaptive filter parameter comprises inputs used to control filtering applied by the read channel portion of the read/write channel 152. The tap weight parameter comprises tap weight values used by transversal equalizer circuitry commonly used in read channels employing partial response, maximum likelihood (PRML) detection techniques. MR Asymmetry compensation is compensation applied to readback signals from magneto-resistive (MR) heads in order to reduce asymmetry in positive and negative peaks of the readback signals. VGA Gain and Servo Bandwidth values optimize the gain of variable gain amplifiers and the response characteristics of the disc drive servo circuit 156. For general discussions of these and other parameters, see U.S. Pat. No. 5,422,760 entitled DISK DRIVE METHOD USING ZONED DATA RECORDING AND PRML SAMPLING DATA DETECTION WITH DIGITAL ADAPTIVE EQUALIZATION, issued Jun. 6, 1995 to Abbott et al., U.S. Pat. No. 4,907,109 entitled MAGNETIC DISC DRIVE SYSTEM HAVING AUTOMATIC OFFSET AND GAIN ADJUSTMENT MEANS, issued Mar. 6, 1990 to Senio and U.S. Pat. No. 5,592,340 entitled COMMUNICATION CHANNEL WITH ADAPTIVE ANALOG TRANSVERSAL EQUALIZER, issued Jan. 7, 1997 to Minuhin et al., the latter of which is assigned to the assignee of the present invention.

As mentioned above, the parameter sets listed in Table I. are optimized during disc drive manufacturing using conventional optimization techniques. More particularly, during DBI the parameters are selected to maximize disc drive performance (such as read error rate performance) when the disc drive 100 is operated within each of the identified contiguous temperature ranges (that is, below 15° C., at and between 15° C. and 45° C. and above 45° C.). It will be recognized that other temperature ranges, as well as a different number of ranges, can be readily employed, depending upon the requirements of a given application.

Each set of parameters is stored within the disc drive 100 in a manner to provide subsequent access by the control processor 142. For example, the parameters can be written to guard tracks not normally used by the disc drive 100 to store user data and subsequently loaded into DRAM 144 upon initialization; alternatively, the parameters can be stored in the flash memory 146. It will be recognized that improved disc drive performance will generally be attained through the establishment of parameter sets for a greater number of temperature dependent parameters, as long as sufficient memory space and processing capability exists within the disc drive 100 to utilize the same.

Referring now to FIG. 3, shown therein is a flow chart illustrating a TEMPERATURE DEPENDENT PARAMETRIC CONFIGURATION routine 200, which is performed once the parameter sets of Table I. have been identified. The routine of FIG. 3 is generally representative of programming stored in the flash memory 146 (FIG. 2) and utilized by the control processor 142 (FIG. 2). The routine is contemplated as a top level routine run in conjunction with other conventional routines of the disc drive 100.

The routine begins at block 202, wherein the disc drive 100 first enters a spinup operation during which the disc drive is powered up and the discs 108 are accelerated to a nominal operational speed. It will be understood that other conventional initialization routines are performed during block 202 as well, such as the initialization and self-test of various disc drive systems. Once the spinup operation is completed, the control processor 142 checks the temperature of the disc drive 100 by way of the temperature sensor 160 and the A/D 162 (FIG. 2) to determine whether the disc drive 100 is operating in the cold, ambient or hot temperature ranges, as indicated by block 204. As will be recognized, the disc drive 100 will usually begin in the cold temperature range after being initialized from a cold start, depending upon the environment in which the disc drive 100 is operated.

The routine of FIG. 3 next loads the appropriate parameter set through the operation of block 206 in accordance with the temperature range determined by block 204. More particularly, the respective elements of the read/write channel 152 and the servo circuit 156 are supplied with the appropriate parameters by the control processor 142. The control processor 142 next initiates an internal timer to measure elapsed time (EP), block 208, at the completion of the operation of block 210. The timing operation can be performed by the control processor 142 directly, or additional counter hardware (not shown) can be utilized for this purpose.

Continuing with FIG. 3, the routine passes to decision block 210, which checks whether the elapsed time (EP) is less than or equal to 10 minutes. If so, the routine passes to block 212 wherein the control processor 142 begins a one minute timed delay. Of course, the delay of block 214 is only associated with the routine of FIG. 3, so that the control processor 142 proceeds to operate in a conventional manner to control the operation of the disc drive 100 during the delay of block 214. Once the delay is completed, the control processor 142 checks the temperature of the disc drive 100, as shown by block 214, and determines whether a change in temperature range has occurred, as shown by decision block 216.

If such a change has occurred, the appropriate parameter set is implemented in the read/write channel 152 and the servo circuit 156, as indicated by block 218, after which the routine returns back to decision block 210. When no change in temperature range has occurred, the routine simply passes from decision block 216 back to decision block 210.

Thus, after the disc drive 100 has been initialized, the temperature is checked once a minute for the first ten minutes. When a change in the operational temperature range of the disc drive 100 is detected, the appropriate parameter set is used. Although other timing schemes can be readily implemented, checking the temperature every minute for the first 10 minutes will generally ensure that optimal parameters are continually utilized by the disc drive 100 at a time when relatively large changes in temperature often occur (i.e, during the first few minutes after disc drive initialization).

Continuing with FIG. 3, after ten minutes have elapsed since disc drive initialization, the routine passes from decision block 210 to block 220, wherein the control processor enters a 10 minute delay. At the conclusion of the 10 minute delay, the temperature of the disc drive 100 is checked, block 222, and the control processor 142 determines whether a change in the temperature range of the disc drive 100 has occurred. If so, the appropriate parameter set is implemented by block 224 and the routine returns back to block 220 for another 10 minute delay; if not, the routine passes directly back to block 220 without a change in the parameter set. Thus, after the first 10 minutes of disc drive operation, the control processor 142 checks the temperature of the disc drive 100 every 10 minutes and implements the appropriate set of parameters in accordance with changes in the operational temperature range of the disc drive 100.

It is contemplated that the routine of FIG. 3 will continue until such time that the disc drive is deactivated (entering a power off or suspended mode of operation). Further, although the values for most of the parameters of Table I. are generally established during disc drive manufacturing, the parameter sets can be readily updated during operation and these updated parameter sets can be stored by the disc drive 100 for future utilization, as desired.

Although the temperature is preferably measured on a periodic basis, it is contemplated that the temperature can also (or alternatively) be measured at selected operational stages of the disc drive, such as during idle periods, at the beginning of a seek operation, etc., with the parametric configuration of the disc drive being updated accordingly, depending upon whether changes in the operational temperature range of the disc drive have been detected. Moreover, it is contemplated that hysteresis techniques are preferably applied so as to prevent continual changes between two adjacent temperature ranges by the disc drive 100. Thus, for example a ±15° C. band can be advantageously used so that the disc drive does not change from cold to ambient until a temperature of 20° C. is reached (i.e., 15° C.+5° C.) and the disc drive 100 does not change from ambient back to cold until a temperature of 10° C. is reached (i.e., 15° C.−5° C.). As provided above, other temperature boundary values, as well as the number of temperature ranges, can be readily selected, depending upon the requirements of a given application.

Having concluded the foregoing discussion of FIGS. 1–3, a second, alternative embodiment of the present invention will now be presented. With reference to FIG. 4, shown therein is an alternative functional block diagram of the disc drive 100 of FIG. 1, operably coupled to the host computer 140, as before. As several of the components of FIG. 4 are similar to those previously presented in FIG. 2, like reference numerals have been used in both drawings.

The arrangement of the various functional circuits of the disc drive 100 in FIG. 4 has been provided to more clearly point out that the disc drive 100 comprises a head-disc assembly (HDA) 230 which generally houses the mechanical components of the disc drive 100 visible in FIG. 1. FIG. 4 further sets forth the aforementioned disc drive printed circuit board (designated at 240) which is attached to the underside of the HDA 230 in a manner known in the art. For purposes of clarity, control processor memory (MEM) 242 shown in FIG. 4 corresponds to the DRAM 144 and flash memory 146 of FIG. 2.

Continuing with FIG. 4, also shown is an integrated temperature measurement circuit 250, constructed in accordance with a preferred embodiment of the present invention. As will be explained in greater detail below, the integrated temperature measurement circuit 250 operates to provide an indication of operational temperature of the disc drive 100. Generally, however, the integrated temperature measurement circuit 250 outputs an analog temperature measurement signal on path 252 to a driver circuit 254, which amplifies the measurement signal and provides the same on path 256 to an analog to digital (A/D) converter 258, operably coupled to the control processor 142 by path 260, so that the control processor 142 has access to a digital representation of the measurement signal provided by the integrated temperature measurement circuit 250. Preferably, the integrated temperature measurement circuit 250 is integrated into a motor control application specific integrated circuit (ASIC, denoted by dotted line enclosure 261) additionally comprising at least portions of the servo circuit 156 and the spindle circuit 158, to enhance the manufacturability and reliability of the disc drive 100.

Referring now to FIG. 5, shown therein is a schematic diagram of the integrated temperature measurement circuit 250 of FIG. 4 in greater detail. The integrated temperature measurement circuit 250 of FIG. 4 is shown to include four nominally identical p-metal oxide semiconductor field effect transistors (PMOSFETs) 262, 264, 266, 268, designated for reference purposes as $M_1$, $M_2$, $M_3$ and $M_4$, respectively. The PMOSFETs 262, 264, 266, 268 have source connections which are operably coupled to a voltage source 270, with the voltage source outputting a voltage $V_{CC}$, such as nominally +5 volts direct current (DC).

The PMOSFETs 262, 264, 266, 268 are operably coupled as shown to a pair of bi-polar npn transistors 272, 274, denoted as $Q_1$ and $Q_2$. The transistors 272, 274 are rationed in size by a factor n, so that $Q_2$ transistor 274 is n times smaller than $Q_1$ transistor 272. Also shown in FIG. 5 are resistors 276, 278, 280, 282, 284, 286, denoted as $R_1$, $R_2$, $R_3$, $R_4$, $R_5$ and $R_6$, respectively and connected as shown. Path 252, which transmits the temperature measurement signal as mentioned above with respect to FIG. 4, is shown in FIG. 5 to be operably connected between the $M_4$ PMOSFET 268 and the $R_6$ resistor 286.

To explain how the integrated temperature measurement circuit 250 generate the temperature measurement signal on path 252, it will be first noted that $M_1$ and $M_2$ PMOSFETs 264, 266 are configured as a current mirror, so that the $Q_1$ and $Q_2$ transistors 272, 274 conduct the same magnitude of current; that is, as shown by arrows 288 and 290 in FIG. 5, $Q_1$ transistor 272 conducts a collector current $I_1$ and $Q_2$ transistor 274 conducts a collector current $I_2$, and $I_1=I_2$. As the $Q_1$ and $Q_2$ transistors 272, 274 each have a current gain $\beta$ much greater than one ($\beta>>1$), any voltage drop across $R_3$ resistor 280 will be negligible, so that a voltage at the base of the $Q_1$ transistor 272 can be considered as being nominally equal to a voltage at the base of the $Q_2$ transistor 274. Consequently, the following relationships will hold:

$$V_{BE2}=V_{BE1}+I_1R_1 \quad (1)$$

$$V_A=V_{BE2}+R_2(I_1+I_2) \quad (2)$$

where $V_{BE1}$ is a voltage from emitter to base of the $Q_1$ transistor 272, $V_{BE2}$ is a voltage from emitter to base of the $Q_2$ transistor 274, and $V_A$ is a voltage at node 292 (denoted "A" in FIG. 3). Moreover, because $$I_1 = I_2 = \frac{(V_{BE2} - V_{BE1})}{R_1} \quad (3)$$

then $$V_A = V_{BE2} + \frac{2R_2(V_{BE2} - V_{BE1})}{R_1} \quad (4)$$

As will be recognized, the base to emitter voltage $V_{BE}$ of a bipolar transistor (such as $Q_1$, $Q_2$) is generally given by the following relationship:

$$V_{BE} = \frac{kT}{q}\ln\left[1 - \frac{(I_E + A_1 I_C)}{I_{EO}}\right] \quad (5)$$

where k is Boltzmann's constant, T is temperature in degrees Kelvin, and q is electronic charge. The term (kT/q) is a voltage equivalent of temperature, or VT (about 26 millivolts at room temperature). $I_E$ is emitter current, $I_C$ is collector current, and $A_1$ is common-base current gain. $I_{EO}$ is emitter reverse saturation current, described by:

$$I_{EO} = KT^m \exp\left(\frac{V_{EB}}{VT}\right) \quad (6)$$

where $V_{EB}$ is voltage from emitter to base and VT is the voltage equivalent of temperature discussed above with reference to equation (5). K and m are well known process parameters relating to circuit integration, with m falling within a range of from one to two ($1 \geq m \geq 2$) for silicon bipolar transistors. The parameter K is proportional to emitter-base area of the transistor. Hence, although the $Q_1$, $Q_2$ transistors 288, 290 conduct the same current, such transistors do so at different current densities. The value of current $I_1$, $I_2$ is set by the value of the $R_1$ resistor 276, and the value of the $R_2$ resistor 278 establishes the voltage range for the voltage $V_A$.

The voltage $V_A$ will vary with temperature as follows:

$$V_{BE}(T) = \frac{T}{T_0}(V_{BEO} - V_{g0}) + V_{g0} \quad (7)$$

with $V_{BEO}$ the base to emitter voltage at a selected reference temperature $T_0$ (such as zero degrees Celsius, i.e., 0° C.). $V_{g0}$ is a zero-temperature energy gap voltage, which for silicon bipolar transistors is about 1.21 volts. It will be recognized that third order effects dependent upon VT and the collector current will exist, but such are negligible when compared to the general relationship of equation (7).

It is well known that base-emitter voltage changes for a silicon bipolar transistor (such as $Q_1$, $Q_2$) at a nominal rate of −2.5 millivolts per degree Celsius (i.e., −2.5 mV/° C.). The currents $I_1$, $I_2$, dependent upon ($V_{BE2} - V_{BE1}$) and $R_1$, will generally change linearly with temperature, in accordance with the following relationship:

$$\frac{d}{dT}I_1(T) = \left(\frac{T}{T_0}\right)\left[\frac{(V_{BE20} - V_{BE10})}{R_1}\right] \quad (8)$$

Hence, by mirroring the current $I_1$ through $M_4$ PMOSFET 268 as shown in FIG. 5, voltage at path 252 will be nominally linear with respect to temperature, thereby facilitating the generation of the temperature measurement signal, as discussed above. The disc drive 100 can thereafter utilize the temperature measurement signal of path 252 to optimize operational performance in accordance with the routine of FIG. 3.

It will now be appreciated that the integrated temperature measurement circuit 250 provides several important advantages over the prior art, in that accurate temperature measurements are available to the control processor 142 as desired, facilitating continual updates of the parameters utilized by the disc drive 100. Integrating the temperature measurement circuit 250 into an ASIC (such as the motor control ASIC discussed above) is highly advantageous, in that such an ASIC has a relatively low power dissipation rate and maintains an operational temperature that is substantially that of the disc drive 100. Moreover, integration of the circuit 250 eliminates the necessity for the procurement and installation of a discrete temperature sensing device, minimizing part count, manufacturing costs and simplifies PWA layout. The reliability of the disc drive 100 is also enhanced, through the reduction in parts and the superior performance provided by the integration of the circuit 250.

In summary, it will be clear that the present invention is directed to a method and apparatus for optimizing operational performance of a disc drive (such as 100).

The disc drive is provided with an integrated temperature measurement circuit (such as 250) which provides a temperature measurement signal indicative of operational temperature of the disc drive. The integrated temperature measurement circuit is formed as part of an application specific integrated circuit (such as 261) housing additional circuitry (such as 156, 158) used by the disc drive during operation.

A parametric configuration circuit (such as 142, 144, 146, 242), operably coupled to the integrated temperature measurement circuit, identifies selected parameters for use by the disc drive to optimize disc drive performance, the parameters arranged as a plurality of parameter sets corresponding to a plurality of predefined operational temperature ranges. The parametric configuration circuit periodically measures the operational temperature of the disc drive through evaluation of the temperature measurement signal (such as by 214, 222), identifies the operational temperature range in which the measured operational temperature falls (such as by 216, 224), and implements the appropriate parameter set corresponding to the identified operational temperature range (such as by 218, 226). A selectable delay is implemented (such as by 210, 212, 220) between periodic measurements of the operational temperature of the disc drive.

For purposes of the appended claims, the term "circuit" will be understood both hardware and software implementations. Moreover, although method steps have been set forth in various claims in a particular order, it will be recognized that the scope of such claims is not necessarily limited to performance in such order.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for optimizing operational performance of a disc drive, comprising steps of:

(a) providing an integrated temperature measurement circuit which provides a temperature measurement signal indicative of operational temperature of the disc drive and is formed as part of an integrated circuit which houses additional circuitry used by the disc drive during operation, wherein the integrated temperature measurement circuit comprises first and second transistors each having a base, a collector and an emitter, wherein first and second collector to emitter currents are respectively passed through the first and second transistors with the first and second currents having nominally the same magnitude, and wherein the temperature measurement signal is generated in relation to a difference between a base to emitter voltage of the first transistor and a base to emitter voltage of the second transistor; and (b) adjusting at least one variably selectable parameter of the disc drive affecting the operational performance of the disc drive in response to the temperature measurement signal from the integrated temperature measurement circuit.

2. The method of claim 1, wherein the adjusting of step (b) further comprises steps of:

(b1) establishing a plurality of parameter sets corresponding to a plurality of predefined, contiguous operational temperature ranges for the disc drive;

(b2) periodically evaluating the temperature measurement signal to determine the operational temperature of the disc drive;

(b3) identifing the operational temperature range in which the measured operational temperature falls; and (b4) using the parameter set corresponding to the identified operational temperature range, so that a different one of the parameter sets is used each time that the measured temperature of the disc drive changes from one operational temperature range to another operational temperature range.

3. The method of claim 2, wherein the establishing of step (b1) further comprises steps of:

(b1i) sequentially operating the disc drive at each of the operational temperature ranges; and (b1ii) selecting the parameter set for each operational temperature range that maximize the operational performance of the disc drive.

4. The method of claim 2, wherein the periodic evaluating of step (b2) is further characterized by:

(b2i) initiating a timer indicative of elapsed time since a most recent initialization of the disc drive; and (b2ii) measuring the operational temperature of the disc drive after selected increments of elapsed time.

5. The method of claim 1, further comprising a prior step of providing the disc drive with a disc journaled about a spindle motor, and wherein the additional circuitry comprises spindle motor driver circuitry of step (a) used to control rotation of the spindle motor.

6. The method of claim 1, wherein the at least one variably selectable parameter of step (b) comprises a parameter used by the additional circuitry of step (a).

7. The method of claim 1, wherein step (a) comprises a further step of ratioing the first and second transistors in size by a factor n so that the second transistor is n times smaller than the first transistor.

8. The method of claims 7, wherein step (a) comprises a further step of providing the integrated temperature measurement circuit with a resistor and current mirror circuitry which generates a third current having a magnitude equal to the first current, wherein the third current is passed through the resistor to establish a voltage across the resistor, and wherein the temperature measurement signal comprises the voltage across the resistor.

9. A disc drive, comprising:

an integrated circuit device comprising control circuitry used by the disc drive during operation and a temperature measurement circuit which provides a temperature measurement signal indicative of operational temperature of the disc drive, wherein the integrated temperature measurement circuit comprises first and second transistors each having a base, a collector and an emitter, wherein first and second collector to emitter currents are respectively passed through the first and second transistors with the first and second currents having nominally the same magnitude, and wherein the temperature measurement signal is generated in relation to a difference between a base to emitter voltage of the first transistor and a base to emitter voltage of the second transistor; and a parametric configuration circuit, operably coupled to the integrated circuit device, which adjusts at least one variable selectable parameter of the disc drive in response to the temperature measurement signal from the integrated temperature measurement circuit.

10. The disc drive of claim 9, wherein the parametric configuration circuit identifies selected parameters for use by the disc drive to optimize disc drive performance, the parameters arranged as a plurality of parameter sets corresponding to a plurality of predefined operational temperature ranges, and wherein the parametric configuration circuit determines the operational temperature of the disc drive from the temperature measurement signal, identifies the operational temperature range in which the measured operational temperature falls, and implements the parameter set corresponding to the identified operational temperature range.

11. The disc drive of claim 10, wherein the parametric configuration circuit comprises a control processor which controls the operation of the disc drive.

12. The disc drive of claim 10, further comprising:

a controllably positionable head adjacent a rotatable disc; and a write current driver circuit operably connected to the head, wherein the parameters comprise values of write current magnitude, and wherein the parametric configuration circuit instructs the write current driver circuit to utilize the values of write current magnitude associated with the parameter set corresponding to the identified operational temperature range.

13. The drive of claim 12, further comprising:

a read/write channel responsive to the head which transfers data to and from the disc in cooperation with the head, wherein the parametric configuration circuit instructs the read/write channel to utilize the parameter set corresponding to the identified operational temperature range.

14. The disc drive of claim 12, further comprising:

a servo control circuit responsive to the head which controls the position of the head with respect to the disc, wherein the parametric configuration circuit instructs the servo control circuit to utilize the parameter set corresponding to the identified operational temperature range.

15. The disc drive of claim 9, wherein the first and second transistors are ratioed in size by a factor n so that the second transistor is n times smaller than the first transistor.

16. The disc drive of claim 15, wherein the integrated temperature measurement circuit further comprises a resistor and current mirror circuitry which generates a third current having a magnitude equal to the first current, wherein the third current is passed through the resistor to establish a voltage across the resistor, and wherein the temperature measurement signal comprises the voltage across the resistor.

* * * * *